United States Patent [19]
Cleland

[11] 3,968,715
[45] July 13, 1976

[54] VIBRATION RESISTANT BAND SAW WHEEL
[75] Inventor: Charles E. Cleland, Edina, Minn.
[73] Assignee: Continental Machines, Inc., Savage, Minn.
[22] Filed: June 27, 1975
[21] Appl. No.: 590,816

[52] U.S. Cl. .................................. 83/820; 83/698; 83/788
[51] Int. Cl.² .......................................... B26D 1/54
[58] Field of Search ............ 83/820, 698, 788, 659; 308/18; 242/155 R; 73/430, DIG. 1; 248/358 R

[56] References Cited
UNITED STATES PATENTS

| | | | |
|---|---|---|---|
| 2,954,061 | 9/1960 | Stordal | 83/820 X |
| 2,976,738 | 3/1961 | Bascom | 83/820 X |
| 3,363,495 | 1/1968 | Turnbull | 83/788 X |
| 3,483,783 | 12/1969 | Robinson et al. | 83/788 |

*Primary Examiner*—Frank T. Yost
*Attorney, Agent, or Firm*—Kirkland & Ellis

[57] ABSTRACT

A vibration resistant band wheel for band saw machines wherein an endless cutting band is customarily trained in tension around the peripheral surfaces of spaced band wheels with the back edge of the cutting band acting against a flange extending radially outward from the rear face of the band wheels and the cutting edge of the cutting band overhanding the non-flanged front face of the band wheels. A tire of resilient material is fitted on the peripheral surface of a band wheel having a disc shaped body such that the resiliant material tire lies between the band wheel flange and the non-flanged front face. A metallic cutting band contact tire is fitted on the peripheral surface of the band wheel over the resilient material tire with one edge of the contact tire adjacent the band wheel flange, thereby providing a metallic contact surface for engaging the cutting band. Retainer plates act to hold the resilient material tire and the contact tire on the peripheral surface of the band wheel. Vibrations in the cutting band resulting from cutting operations are transferred to the contact tire, and are absorbed or dampened by the resilient material tire, and thus, are prevented from reaching the band wheel disc shaped body, and causing band wheel noise.

15 Claims, 5 Drawing Figures

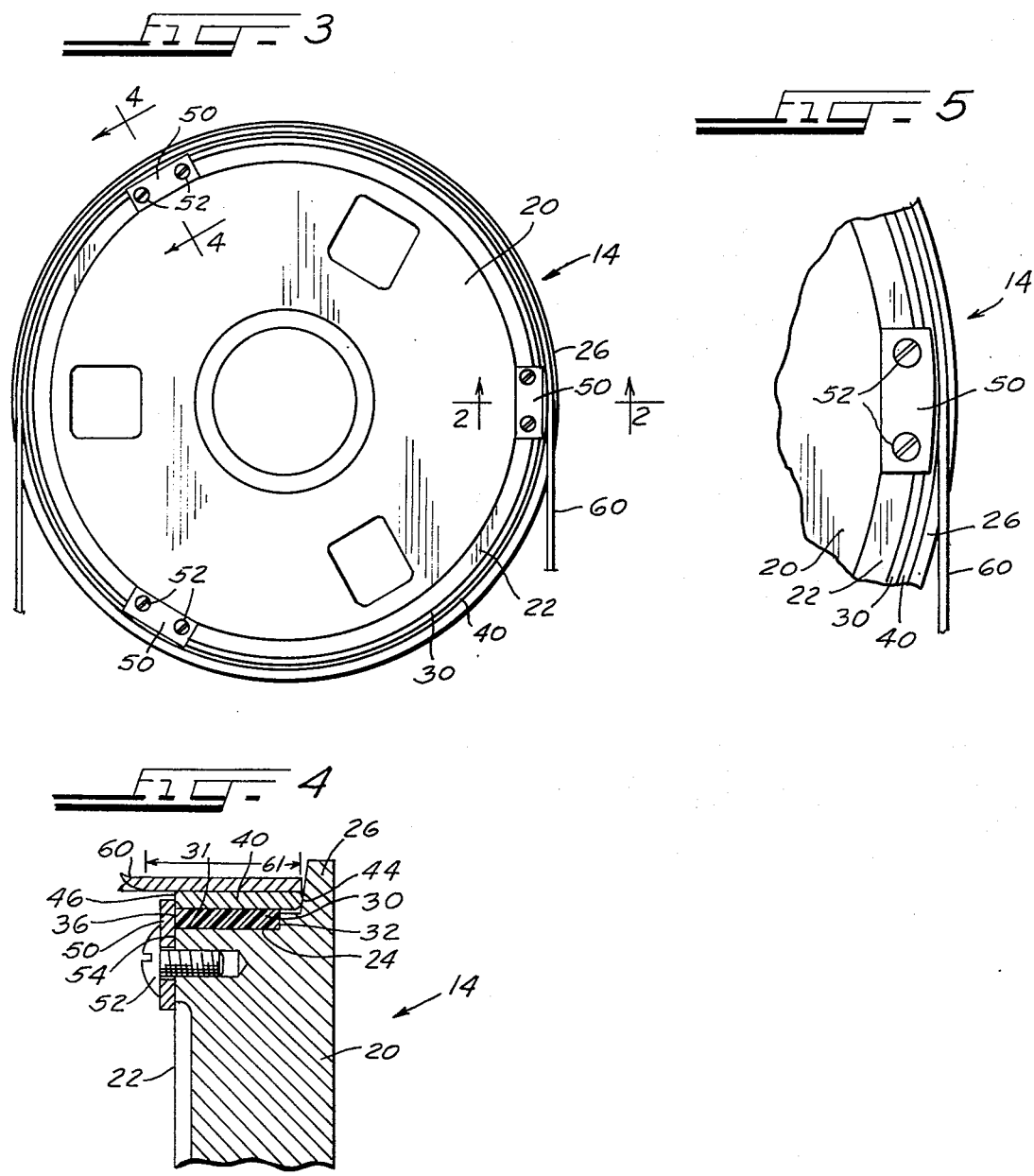

VIBRATION RESISTANT BAND SAW WHEEL

BACKGROUND OF THE INVENTION

1. Field of the Invention

The present invention relates to band wheels for band saws and relates more particularly to a vibration resistant structure for a flanged band wheel for use in a band saw machine of the type in which the cutting band is trained in tension around the peripheral surfaces of spaced band wheels with the back edge of the cutting band acting against a flange extending radially outward from the rear face of the band wheels and the cutting edge of the cutting band overhanging the non-flanged front face of the band wheels.

2. Description of the Prior Art

In band saw machines, the cutting band or blade is typically trained in tension around the peripheral surfaces of two or more spaced band wheels which rotate about substantially parallel axes. At least one of these band wheels lies downstream of the work piece, i.e., lies in a position to engage the cutting band immediately after it has passed through the work area. The downstream band wheel, if powered, imparts a linear force, known as a cutting force, on the cutting band sufficient to pull the cutting band through the work piece. If the downstream band wheel is not powered, the cutting force imparted to the cutting band by some powered wheel is transmitted around the downstream band wheel to the work area so that the cutting force acts in a downward direction on the work piece. The upstream band wheel, i.e., the band wheel positioned to engage the cutting band immediately before it passes through the work area, is typically the powered wheel when the downstream band wheel is not powered and is positioned above the work area to guide the cutting band into the work piece.

Customarily, band wheels for band saw machines are metallic discs having large diameters so as to reduce bending stresses on the cutting band and to give the band saw work area a large depth so that wide or large pieces can be cut. Heretofore known band wheels fall into essentially three broad structural types or categories. The first general type is a crowned resilient material tire band wheel characterized by a rounded resilient material tire fitted to the peripheral surface of a non-flanged band wheel to engage the cutting band or blade. The second general type band wheel is characterized by a slightly conical or cylindrical resilient material tire fitted on the peripheral surface of a band wheel having a flange extending radially outward from its rear face. Examples of the use of resilient material tires on band wheels are shown in U.S. Pat. No. 3,363,495 — Turbull and U.S. Pat. No. 2,954,061 — Stordal. The resilient material employed for such tires is customarily an oil resistant synthetic rubber such as 1-neoprene or Buna N.

The third general type band wheel, that to which the present invention relates, is characterized by a solid metal peripheral surface which is usually an integral part of the band wheel disc body portion, but which may be a metallic tire or ring which is fitted to the peripheral surface of the band wheel. The third type band wheel is further characterized by a flange extending radially outward from the rear face of the band wheel against which a cutting band of width greater than the width of the band wheel peripheral surface acts during cutting operations.

The resilient material tire band wheels of the first and second types, unlike the third type band wheels, make possible the use of cutting bands narrower than the width of the band wheel peripheral surface since the "set" teeth are permitted to sink into the resilient tire surface and thus, are not damaged. In addition, the resilient material tire is relatively inexpensive and therefore can be cheaply replaced following damage or wear. Notwithstanding the foregoing benefits of the resiliant material tire band wheels, integral solid metal and metallic tire band wheels have exhibited functional superiority over resilient material tire band wheels in nearly every respect, particularly for heavy duty cutting operations. Specifically, resilient material tire band wheels quickly lose traction when cutting oils are employed in the cutting operation and also tend to pick up and accumulate cutting chips. In contrast, integral solid metal and metallic tire band wheels maintain good traction in the presence of cutting oils and tend not to accumulate cutting chips. In addition, integral solid metal and metallic tire band wheels exhibit a greater wear life than resilient material tire band wheels. Thus, the third type, integral solid metal or metallic tire, band wheels are widely recognized as preferable to resilient material tire band wheels for nearly all applications, particularly heavy duty applications, wherein the cutting band can be of a width sufficient to allow the cutting teeth to overhang the front face of the band wheel.

The third type band wheel, however, is disadvantaged in that machines employing integral solid metal or metallic tire band wheels are extremely noisy. The noise from such machines is caused by vibration of the large metal disc body section of the upstream and downstream band wheels, particularly the upstream band wheel, which disc body sections act as sounding boards. Vibration of the large metal disc body sections of the band wheels typically arises as the result of vibratory motion transmitted to the band wheel disc body section from the cutting band which vibrates at high frequencies during cutting operations. Techniques for reducing the transfer of cutting band vibration, which may be lateral in the cutting band or longitudinal in its length, and for reducing band saw machine noise have thus far been unsatisfactory.

It has long been recognized that synthetic rubber or some other resilient material can be interposed between a first vibrating body and a second body to reduce the amount of vibratory motion transferrerd from the first vibrating body to the second body. However, because of chip pick up and cutting fluid slippage problems encountered with resilient material tire band wheels, particularly in heavy duty applications, synthetic rubber or other resilient materials cannot be satisfactorily interposed between the vibrating cutting band and the band wheel. Consequently, such resilient materials have long been considered unsuited for use as a means of reducing band wheel vibration and noise in band saw machines where integral solid metal or metallic tire band wheels are preferable or necessary and not other means has been developed to satisfactorily overcome the noise problems of such machines.

Thus, it would be a desirable advance in the art to provide a vibration resistant band wheel for reducing the noise of band saw machines. It would also be a desirable advance in the art to provide a metallic tire band wheel which inhibits the transfer of vibratory motion from the cutting band to the disc body section of the band wheel. It would be a further desirable advance in the art to provide a band wheel arrangement whereby synthetic rubber or some other resilient material can be interposed successfully in the path of vibratory motion between the vibrating cutting band and the band wheel to reduce the amount of high frequency vibratory motion transmitted from the cutting band to the disc body section of the band wheel.

BRIEF DESCRIPTION OF THE INVENTION

A vibration resistant band wheel for a band saw machine wherein an endless cutting band is trained in tension around the peripheral surfaces of spaced upstream and downstream band wheels with the back edge of the cutting band acting against a flange extending radially outward from the rear face of the band wheels and the cutting edge of the cutting band overhanging the non-flanged front face of the band wheel. The vibration resistant band wheel comprises a circular disc body section having a peripheral surface and a flange extending radially outward from the rear face of the disc body section. A tire or ring, hereinafter referred to as the "resilient tire," composed of resilient material is fitted tightly around the peripheral surface of the band wheel, preferably such that one edge of the tire engages the band wheel flange and the other edge of the tire lies flush with the front face of the band wheel. A metallic cutting band contact tire, hereinafter referred to as the "contact tire," is fitted tightly over the resilient tire preferably such that its back edge lies adjacent but not in contact with the band wheel flange and its front edge lies substantially flush with the front face of the band wheel. The resilient tire and contact tire combination is retained in position on the band wheel peripheral surface between the band wheel front face and the band wheel flange by means of retainers composed of non-metallic material or metallic material separated from the band wheel face by a layer of non-metallic material. The retainers are uniformly spaced around the front face of the band wheel such that a portion of each of the retainers, which are attached to the band wheel front face by means of screws, extends radially outward along the front face of the band wheel to prevent the resilient tire and the contact tire from sliding off the band wheel peripheral surface.

As employed in an operational band saw machine, a cutting band is trained in tension around the peripheral surfaces of spaced upstream and downstream band wheels each employing a resilient tire and contact tire combination as described, preferrably such that the non-toothed portion of the cutting band, i.e., that portion of the cutting band between the base of the cutting teeth and the back edge of the cutting band, is symmetrically centered above the resilient tire. The peripheral surface of the band wheel and the flange are preferrably designed so that when the non-toothed portion of the cutting band is symmetrically centered above the resilient tire, the back edge of the cutting band is in engagement with the band wheel flange and the cutting edge of the cutting band is overhanging the front face of the band wheel. With the resilient tire and non-toothed portion of the cutting band positioned as described, the surface of the cutting band lies in flat contact with the contact tire surface.

In operation, high frequency vibrations arising in the cutting band as a result of cutting action of the cutting band teeth in the work piece are transmitted to the contact tire by the direct flat contact between the contact tire surface and the cutting band surface. High frequency vibratory motion of the contact tire is absorbed or dampened by the resilient tire which is interposed between the contact tire and the peripheral surface of the band wheel and thus, high frequency vibratory motion is prevented from reaching the disc body section of the band wheel, thereby reducing band saw machine noise.

The vibration resistant band wheel of the present invention exhibits the advantageous characteristics of the third type, integral solid metal or metallic tire, band wheels in that the contact tire is metallic and, therefore, capable of enduring frictional wear resulting from cutting band stalls, slippage and work piece hang-ups and of avoiding chip pick-up and slippage in the presence of cutting fluids of high lubricity. As an added advantage, the contact tire can be easily replaced following damage or excessive wear.

Thus, it is an object of the present development to provide a vibration resistant band wheel of the third type for reducing noise in band saw machines.

It is a further object of the present development to provide a flanged band wheel with a metallic contact tire suited for heavy-duty applications.

It is also an object of the present invention to provide a flanged band wheel with a metallic contact surface which, after excessive wear, can be easily replaced.

It is a further object of this invention to provide a band wheel arrangement wherein a resilient material can be successfully interposed in the path of vibratory motion to reduce high frequency band wheel noise.

These and other objects, advantages, and features of the present invention will hereinafter appear from the complete description of the preferred embodiment of the present invention which, for purposes of illustration, but not for limitation, is illustrated in the accompanying drawings.

DESCRIPTION OF THE DRAWINGS

FIG. 3 is an elevation view of the front face of a band wheel embodying the present invention.

FIG. 4 is a cross-section, taken along line 4—4, of the band wheel shown in FIG. 3.

FIG. 5 is a fragmentary view of a band wheel front face illustrating the retainer means of the present invention and the manner in which the resilient tire and contact tire are fitted to the peripheral surface of the band wheel.

DETAILED DESCRIPTION OF THE PREFERRED EMBODIMENT

Figure 1:
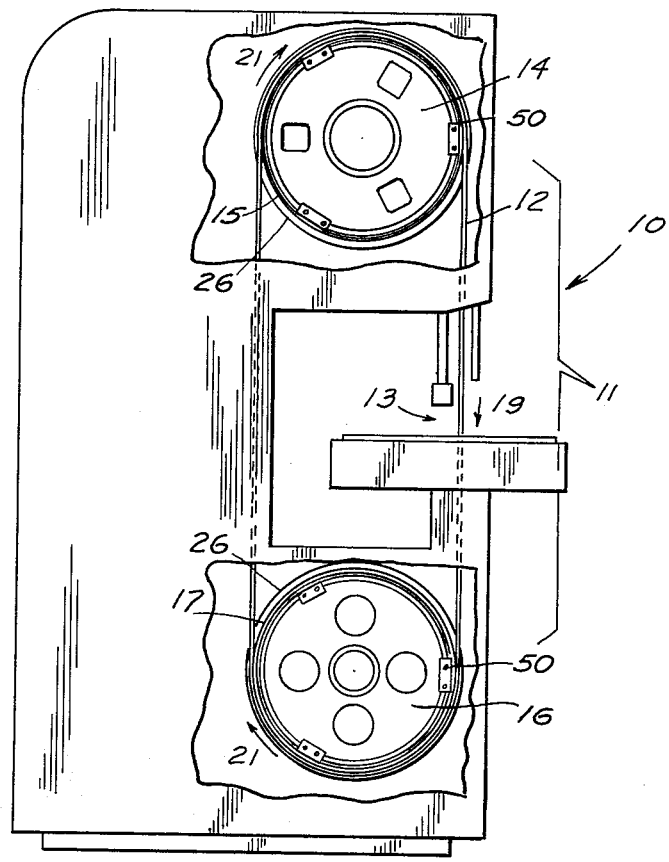
FIG. 1 is a right-side elevation view of an exemplary band saw machine in which the present invention might be employed.

With reference to FIG. 1, the vibration resistant band wheel of the present invention is intended primarily for use in band saw machines such as conventional band saw machine 10 of the type wherein a cutting band 12 is trained in tension over the peripheral surfaces 15 and 17 respectively (seen as circular lines in FIG. 1) of spaced upstream and downstream band wheels 14 and 16 with one edge of cutting band 12 adjacent a flange 26 which extends radially outward from the rear faces (see FIGS. 2 and 4) of upstream and downstream band wheels 14 and 16 respectively. Customarily, a straight stretch 11 of cutting band 12 extends through the work area 13 where a work piece (not shown) may be freely maneuvered for cutting. Conventionally, either upstream band wheel 14 or downstream band wheel 16 is power driven by suitable drive means (not shown) and the other of either upstream and downstream band wheels 14 and 16 respectively is free to rotate in response to the linear force transmitted through cutting band 12 from the power driven band wheel. The band wheel which is not power driven is customarily referred to as an idler wheel. Although in band saw machine 10, illustrated in FIG. 1, the cutting stretch 11 is oriented to extend vertically and upstream and downstream band wheels 14 and 16 respectively are oriented to rotate in a vertical plane about horizontal axes, it should be understood that the vibration resistant band wheel of the present invention may be employed in any band saw machine of the general type described irrespective of the orientation of the cutting stretch 11 or the rotational orientation of upstream and downstream band wheels 14 and 16.

Figure 2:
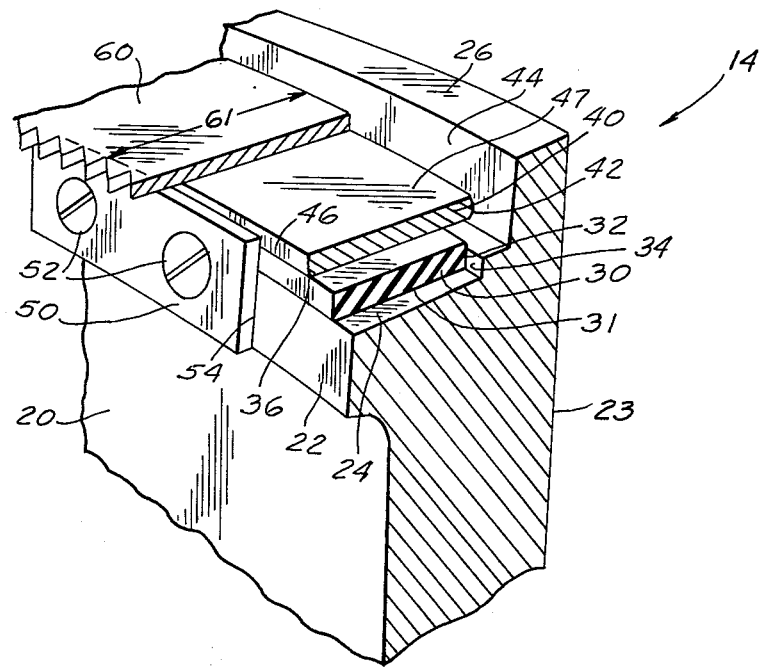
FIG. 2 is a perspective cross-sectional view, taken along line 2—2, of a portion of a band wheel embodying the present invention.

With reference to FIGS. 2 through 5, vibration resistant band wheel 14 of the present invention comprises disc body section 20 having a front face 22, a peripheral surface 24 and a flange 26 radially extending outward from rear face 23. In the preferred embodiment, resilient tire 30 composed of resilient material is fitted to peripheral surface 24 of band wheel 20 with one of its edges 32 adjacent and preferably engaging face 34 of flange 26 and its other edge 36 preferably lying substantially flush with front face 22 (see FIG. 4). Metallic contact tire 40 composed of metal is fitted above peripheral surface 24 over resilient tire 30 preferably with its back edge 42 adjacent but not engaging face 44 of flange 26 and its front edge 46 lying substantially flush with front face 22 of vibration resistant band wheel 14. While faces 34 and 44 respectively of flange 26 are shown in FIGS. 2 and 4 to be distinct from one another, it should be understood that face 34 and face 44 may, for purposes of the present invention, be coplanar. However, to maintain cutting band 60 parallel to peripheral surface 24 and in flat contact with contact tire 40 during cutting operations, it is important to center resilient tire 30 in relation to the non-toothed portion 61 (indicated by dimension arrow 61 in FIGS. 2 and 4) of cutting band 60. In the preferred embodiment, face 34 of flange 26 is staggered toward front face 22 of vibration resistant band wheel 14 by an amount sufficient to insure that for a given cutting band 60 having non-toothed portion 61 and its back edge 42 adjacent face 44 of flange 26, resilient tire 30 is substantially centered below non-toothed portion 61 of the cutting band 60.

Resilient tire 30 is composed of a suitable resilient material. Resilient materials which have been satisfactorily used in the present invention include oil resistant synthetic rubbers such as 1-neoprene and Buna N.

The laminate combination comprising resilient tire 30 and contact tire 40 is held in place between flange 26 and front face 22 above peripheral surface 24 of vibration resistant band wheel 14 by means of retainers, such as retainer 50, which are preferably composed of non-metallic material, but which may comprise a metallic plate separated from band wheel front face 22 by means of a non-metallic spacer (not shown). Exemplary retainer 50 is held in place against the front face 22 by means of screws 52 such that the continuous rings comprising resilient tire 30 and contact tire 40 are retained on band wheel 14 above peripheral surface 24 between faces 34 and 44 respectively of flange 26 and the surface edge 54 of retainer 50.

In use, vibration resistant band wheel 14 is incorporated in a band saw machine such as, for example, band saw machine 10 (FIG. 1) as shown, wherein cutting band 60 is trained in tension around the outer surface 47 of contact tire 40 of vibration resistant band wheel 14 and preferably at least one other appropriately spaced similar band wheel. It should be understood that while at least two band wheels are customarily employed in machines of the type for which the present invention is intended, one or any number of such band wheels may embody the present invention with a resultant reduction in the band saw machine noise level during cutting operations. In particular, with reference to FIG. 1 it has been observed that, with the direction of rotation indicated by arrows 21, as cutting band 12 moves through the work piece (not shown) situated in work area 13 in the direction indicated by arrow 19 the "up stream" band wheel, in this case band wheel 14, creates the greatest amount of noise during cutting operations. Accordingly, the vibration resistant band wheel of the present invention could advantageously be employed in the "up stream" location to significantly reduce the noise of the overall machine. Of course, if the present invention is embodied in all band wheels of a given machine, the noise level reduction results are maximized.

The benefits of the present invention are best seen from noise measurements. For example, using a standard one piece band wheel, a measured noise level of 100 decibels (according to O.S.H.A. standard measuring methods for machine tools) was reduced to 86 decibels when the present invention was employed in the same machine. As is commonly known, in the 90 decibel range, a reduction of approximately 3 decibels is the equivalent of lowering the power of the sound waves (noise) to 50 percent of their previous level. Sound reductions as dramatic as the 14 decibel reduction measured are, of course, extremely apparent to the ear.

In operation, as cutting band 60 passes through the work piece (not shown), the interaction between the cutting teeth and the work piece cause cutting band 60 to vibrate at high frequencies. This high frequency vibration is conventionally transmitted directly to the band wheel through the direct engagement between the cutting band surface and the band wheel peripheral surface and results in vibration of the band wheel and associated noise. In the present invention, however, the high frequency vibratory motion of cutting band 60 is transmitted directly to contact tire 40 and then to resilient tire 30 where such vibratory motion is absorbed or dampened and thus, never reaches the disc body section 20 of vibration resistant band wheel 14. Vibratory motion is prevented from passing to vibration resistant band wheel 14 through retainer 50 by use of non-metallic material in the fabrication of retainers such as retainer 50. While some small amount of high frequency vibratory motion may pass from cutting band 60 to the disc body section 20 of vibration resistant band wheel 14 by means of direct contact between the back edge of cutting band 60 and face 44 of flange 26, the amount of high frequency vibratory motion so transmitted is relatively insignificant. This is particularly true in the preferred embodiment since the contact tire 40 is not clamped between the face 54 of retainer 50 and face 44 of flange 26 but rather lies above resilient tire 30 with its back edge 42 adjacent but not in contact with flange 26. In any event, flange 26, shown in FIGS. 2 and 4 as an integral extension of band wheel 20, may be a separate flange ring, detachable from the remainder of band wheel 20. Complete isolation between cutting band 60, contact tire 40 and band wheel 20, if desired, may be affected by interposing a layer of resilient material between the removable flange ring (not shown) and the remainder of the band wheel.

The tight fit between resilient tire 30 and peripheral surface 24 of band wheel 20 generally prevents slippage between band wheel 20 and resilient tire 30. Similarly, slippage is generally avoided between contact tire 40 and resilient tire 30 due to the tight fit therebetween. Some slippage may occure between the peripheral surface 24 and resilient tire 30 or between resilient tire 30 and contact tire 40 particularly when the vibration resistant tire of the present invention is employed as the powered drive wheel and cutting oils of high lubricity are used. Such slippage is reduced or eliminated by interposing double sided sandpaper or some other high friction material between adjoining surfaces or by conventional vulcanizing techniques or by treatment of surfaces of adjoining surfaces to increase friction. In any event, band wheel 20 embodying the present invention with contact tire 40 engaging cutting band 60, whether employed as the powered drive wheel or as the idler wheel, exhibits heavy-duty operating characteristics substantially similar to those of the third type, integral solid metal or metallic tire, band wheels conventionally employed in machines for heavy-duty cutting operations while at the same time substantially reducing band wheel noise. The present invention is further particularly suited for heavy-duty applications since contact tire 40, following excessive wear or damage, can be removed and replaced simply by removing screws 52 and retainers such as retainer 50 and withdrawing contact tire 40 from band wheel 20 in the direction of band wheel front face 22 and thereafter fitting a new contact tire over resilient tire 30. Thus, the contact tire 40, the wear surface, of band wheel 20 may be replaced easily without the need for replacing either band wheel 20 or resilient tire 30, thereby increasing substantially the life expectancy for band wheel 20 over the life expectancy of integral solid metal wear surface band wheels and equal to or greater than the life expectancy normally experienced with replaceable metallic contact tire band wheels.

It will be understood that the particular and comparative widths and thicknesses of contact tire 40 and resilient tire 30 are shown in the accompanying drawings for purposes of illustration and, therefore, do not limit the scope and spirit of the present invention. Similarly, the form and shape of band wheel 20 flange 26 and retainer 50 are mere illustrations of one embodiment of the present invention and are not intended as limitations of the present invention.

It will be understood that various modifications, variations, and changes in the structure of the embodiment illustrated here may be made without departing from the scope and spirit of the present invention as defined in the appended claims in which I claim:

1. A vibration resistant band wheel arrangement for a band saw of the type having an endless cutting band trained in tension around the peripheral surfaces of spaced band wheels, comprising:

a band wheel having a disc body portion surmounted by a peripheral surface;

a flange extending radially outward at the edge of said peripheral surface of said band wheel disc body portion;

a resilient tire fitted over said peripheral surface of said disc body portion;

a contact tire fitted above said peripheral surface of said disc body portion over said resilient tire;

retainer means for retaining said resilient tire and said contact tire in position on said band wheel over said peripheral surface.

2. A vibration resistant band wheel arrangement for a band saw as claimed in claim 1 wherein said flange is integrally molded with said disc body portion of said band wheel.

3. A vibration resistant band wheel arrangement for a band saw as claimed in claim 1 wherein said resilient tire comprises a ring composed of resilient material.

4. A vibration resistant band wheel arrangement for a band saw as claimed in claim 1 wherein said contact tire comprises a ring composed of metal.

5. A vibration resistant band wheel arrangement for a band saw as claimed in claim 1 wherein said retainer means are composed of non-metallic material.

6. A vibration resistant band wheel arrangement for a band saw as claimed in claim 5 wherein said retainer means comprises a series of rectangular shaped non-metallic plates defining holes through which screws may be inserted for purposes of attachment of said retainer means to said band wheel.

7. A vibration resistant band wheel arrangement for a band saw of the type having an endless cutting band trained in tension around the peripheral surfaces of spaced band wheels, comprising:

a band wheel having a disc body portion with a front face and a rear face, said disc body portion surmounted by a peripheral surface with a flange extending radially outward at the edge of said peripheral surface;

a ring composed of resilient material, said ring being fitted over said peripheral surface of said disc body portion such that one edge of said ring engages said flange;

a ring composed of metal fitted above said peripheral surface of said disc body portion over said resilient ring such that one edge of said metal ring lies adjacent said flange;

retainer means composed of non-metallic material, said retainer means engaging the other edge of said resilient ring and the other edge of said metal ring such that said resilient ring and said metal ring are held above said peripheral surface between said retainer means and said flange.

8. A vibration resistant band wheel arrangement for a band saw as claimed in claim 7 wherein said resilient ring is composed of oil resistant synthetic rubber.

9. A vibration resistant band wheel arrangement for a band saw as claimed in claim 7 wherein said metal ring is composed of steel.

10. A vibration resistant band wheel arrangement for a band saw as claimed in claim 7 wherein the width of said peripheral surface is less than the width of the cutting band of said band saw so that the back edge of said cutting band when positioned for operation at all times lies adjacent said flange and the cutting edge of said cutting band extends axially outward beyond the front face of said band wheel.

11. A vibration resistant band wheel arrangement for a band saw as claimed in claim 7 wherein said flange has a back face substantially co-extensive with the rear face of said band wheel and first and second front faces, said first front face for engaging said resilient ring and said second face for engaging the back edge of said cutting band.

12. A vibration resistant band wheel arrangement for a band saw as claimed in claim 11 wherein one edge of said resilient ring engages said first surface of said flange and the other edge of said resilient ring lies substantially flush with the front face of said band wheel.

13. A vibration resistant band wheel arrangement for a band saw as claimed in claim 11 wherein one edge of said metal ring lies adjacent said second surface of said flange and the other edge of said metal ring lies substantially flush with the front face of said band wheel.

14. A vibration resistant band wheel arrangement for a band saw as claimed in claim 11 wherein said one edges respectively of said resilient ring and said metal ring lie adjacent respectively of said first surface and said second surface of said flange and said other edges of said resilient ring and said metal ring lie substantially flush with the front face of said band wheel.

15. A vibration resistant band wheel arrangement for a band saw of the type having an endless cutting band trained in tension around the peripheral surfaces of spaced band wheels, comprising:
- a disc-shaped band wheel having a disc body portion surmounted by a peripheral surface of width less than the width of the cutting band of said band saw, and further surmounted by a flange extending radially outward from said peripheral surface, said flange having first and second front faces;
- a layer of resilient material lying above said peripheral surface between said flange and front face of said band wheel;
- a layer of metallic material lying substantially above said peripheral surface over said resilient material, said metallic material for engaging the cutting band of said band saw;
- retainer means for holding said resilient material and said metallic material in place above said peripheral surface.

* * * * *